US009042886B2

(12) United States Patent
Carbo Malonda (10) Patent No.: US 9,042,886 B2
(45) Date of Patent: May 26, 2015

(54) METHOD OF AND A SUPPORT NODE FOR REQUESTING REGISTRATION OF STATIONARY USER EQUIPMENT IN A CELLULAR TELECOMMUNICATION SYSTEM

(75) Inventor: Francisco-Borja Carbo Malonda, Puçol (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 453 days.

(21) Appl. No.: 13/498,628

(22) PCT Filed: Apr. 4, 2011

(86) PCT No.: PCT/EP2011/055219
§ 371 (c)(1), (2), (4) Date: May 18, 2012

(87) PCT Pub. No.: WO2012/136246
PCT Pub. Date: Oct. 11, 2012

(65) Prior Publication Data
US 2013/0102310 A1    Apr. 25, 2013

(51) Int. Cl.
*H04W 60/00*    (2009.01)
*H04L 29/06*    (2006.01)
(Continued)

(52) U.S. Cl.
CPC ............. *H04W 60/00* (2013.01); *H04L 63/107* (2013.01); *H04W 12/08* (2013.01); *H04W 4/005* (2013.01); *H04W 84/14* (2013.01)

(58) Field of Classification Search
USPC ............. 455/435.1, 422.1, 433, 456.1, 456.2, 455/456.3, 432.1, 434, 410, 411, 435
See application file for complete search history.

(56) References Cited

U.S. PATENT DOCUMENTS

2010/0267397 A1* 10/2010 Shen et al. ................. 455/456.1

FOREIGN PATENT DOCUMENTS

| EP | 1775976 A1 | 4/2007 | |
| EP | 2207324 A1 | 7/2010 | |
| EP | 2207324 B1 * | 4/2013 | ............. H04L 29/06 |

OTHER PUBLICATIONS

3rd Generation Partnership Project, "3rd Generation Partnership Project; Technical Specification Group Services and System Aspects; General Packet Radio Service (GPRS); Service description; Stage 2 (Release 10)"; Technical Specification 3GPP TS 23.060 v10.3.0 (Mar. 2011), pp. 1-320, 3GPP, Valbonne, France.
(Continued)

*Primary Examiner* — Nathan Mitchell
*Assistant Examiner* — Sayed T Zewari
(74) *Attorney, Agent, or Firm* — Coats & Bennett, PLLC (57) ABSTRACT

Method (71) of, and support node (23; 52, 53; 81) for requesting registration of stationary user equipment in a cellular telecommunication system (12; 20; 51). The system (12; 20; 51) comprising at least one support node (23; 52, 53; 81) for providing communication services to a plurality of users comprising mobile and stationary user equipment (2, 9; 21), each user equipment (2, 9; 21) having a unique equipment identity. Upon receipt of a registration request (28; 54; 72) of a user equipment (2, 9; 21), the support node (23; 52, 53; 81) determines (35; 73) whether the user equipment (2, 9; 21) is stationary user equipment and compares (74) received location information and equipment identity of stationary user equipment with location information and equipment identity of the stationary user equipment stored (14) in the telecommunication system. The registration request (28; 54; 72) is rejected (61; 77) if the comparison does not match (75 No).

19 Claims, 6 Drawing Sheets

(51) Int. Cl.
*H04W 12/08* (2009.01)
*H04W 4/00* (2009.01)
*H04W 84/14* (2009.01)

(56) References Cited

OTHER PUBLICATIONS

3rd Generation Partnership Project, "3rd Generation Partnership Project; Technical Specification Group Core Network and Terminals; Mobile Station (MS)—Serving GPRS Support Node (SGSN); Subnetwork Dependent Convergence Protocol (SNDCP) (Release 10)"; Technical Specification 3GPP TS 44.065 v10.0.0 (Mar. 2011), pp. 1-52, 3GPP, Valbonne, France.

3rd Generation Partnership Project, "3rd Generation Partnership Project; Technical Specification Group Core Network and Terminals; Numbering, addressing and identification (Release 9)"; Technical Specification 3GPP TS 23.003 v9.6.0 (Mar. 2011), pp. 1-77. 3GPP, Valbonne, France.

3rd Generation Partnership Project, "3rd Generation Partnership Project; Technical Specification Group Services and System Aspects; Architectural Requirements for Release 1999 (Release 1999)"; Technical Specification 3GPP TS 23.121 v 3.6.0 (Jun. 2002), pp. 1-57, 3GPP, Valbonne, France.

3rd Generation Partnership Project, "3rd Generation Partnership Project; Technical Specification Group Core Network and Terminals; Mobile radio interface Layer 3 specification; Core network protocols; Stage 3 (Release 10)"; Technical Specification 3GPP TS 24.008 v10.2.0 (Mar. 2011), pp. 1-634, 3GPP, Valbonne, France.

3rd Generation Partnership Project, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10)"; Technical Specification 3GPP TS 48.018 v10.1.0 (Mar. 2011), pp. 1-182, 3GPP, Valbonne, France.

3rd Generation Partnership Project, "3rd Generation Partnership Project; Technical Specification Group Services and System Aspects; Architectural Requirements (Release 10)"; Technical Specification 3GPP TS 23.221 v10.0.0 (Mar. 2011), pp. 1-48, 3GPP, Valbonne, France.

3rd Generation Partnership Project, "3rd Generation Partnership Project; Technical Specification Group Core Network and Terminals; Organization of subscriber data (Release 10)"; Technical Specification 3GPP TS 23.008 v10.1.0 (2010-12), pp. 1-101, 3GPP, Valbonne, France.

3rd Generation Partnership Project, "3rd Generation Partnership Project; Technical Specification Group Services and System Aspects; Network Sharing; Architecture and functional description (Release 10)"; Technical Specification 3GPP TS 23.251 v10.1.0 (Mar. 2011), pp. 1-25, 3GPP, Valbonne, France.

3rd Generation Partnership Project, "3rd Generation Partnership Project; Technical Specification Group Radio Access Network; UTRAN Iu interface Radio Access Network Application Part (RANAP) signalling (Release 10)"; Technical Specification 3GPP TS 25.413 v10.1.0 (Mar. 2011), pp. 1-425, 3GPP, Valbonne, France.

* cited by examiner

METHOD OF AND A SUPPORT NODE FOR REQUESTING REGISTRATION OF STATIONARY USER EQUIPMENT IN A CELLULAR TELECOMMUNICATION SYSTEM

TECHNICAL FIELD

The present invention generally relates to telecommunications and, more specifically, to cellular telecommunications providing communication services to a plurality of users comprising mobile and stationary user equipment.

BACKGROUND

Machine-to-machine, M2M, communication is known as a form of data communication of communication devices or user equipment, UE, also called M2M-devices, that does not necessarily need human interaction. Typically, M2M technology is used for transceiving telemetry data, i.e. data collected by many different types of sensors for many different types of applications, for signalling unusual events or alarming situations, and setting parameters or otherwise controlling devices at and from remote locations.

Communication between M2M-devices is supported using cellular wireless mobile communication technology, like the Global System for Mobile Communication, GSM, the General Packet Radio Service, GPRS, system, the Universal Mobile Telecommunication System, UMTS, and many other cellular telecommunication systems and networks. Nowadays, GPRS technology is considered the preferred choice for many system vendors and operators, but this does not exclude other suitable telecommunication systems.

M2M-devices generally may be distinguished into two categories: mobile user equipment and stationary user equipment. Stationary or fixed user equipment uses wireless technology to connect to central control units, for example. The term stationary or fixed refers to the fact that the respective user equipment is installed at a fixed location or is allowed to move across a predefined limited geographical area covered by the telecommunication network. Such as at home, in an office building, alongside a street for traffic control, and the like. This contrary to mobile user equipment which may unlimited move from one position to an other across the whole geographic area covered by a cellular telecommunication system, for example.

In order to enable a fixed or stationary M2M-device to connect to a cellular telecommunication system, same has to be equipped with wireless communication capability. Generally a Subscriber Identity Module, SIM, card and a transceiver unit for wireless connection. The device has to be provided with a subscription to a network or system operator, providing a subscription or user identity, such as designated International Mobile Subscriber Identity, IMSI, and Mobile Subscriber Integrated Services Digital Network, MSISDN, number, for example.

Each user equipment has a unique equipment identity, called the International Mobile Equipment Identity, IMEI, by which a specific device or user equipment can be uniquely identified in a telecommunications network or in a group of devices operating under a same subscription, i.e. a same IMSI and/or MSIDSN number.

Under normal operation circumstances, after being installed, mobility of such stationary or fixed user equipment is not foreseen and, in some cases, has to be prevented to ensure the intended operation or control function of the M2M-device. That is, the stationary or fixed user equipment may not receive service from the cellular telecommunication system outside the predefined limited geographical area for which the user equipment is regarded stationary.

SUMMARY

It is an object to provide a method for preventing stationary user equipment from registering as mobile user equipment in a cellular telecommunication system.

It is a further object to provide a support node for operating in a cellular telecommunication system for supporting the method.

It is an other object to provide a cellular telecommunication system operating in accordance with the method.

In a first aspect there is provided a method of requesting registration of stationary user equipment in a cellular telecommunication system. The system comprising at least one support node for providing communication services to a plurality of users comprising mobile and stationary user equipment, each user equipment having a unique equipment identity. The method comprises the steps of:

receiving, by a support node, a registration request of user equipment, the registration request comprising equipment identity and location information associated with the user equipment, determining, by the support node, whether the user equipment is stationary user equipment, comparing, by the support node, the received location information and equipment identity of stationary user equipment with location information and equipment identity of the stationary user equipment stored in the telecommunication system, rejecting, by the support node, the registration request if the comparison does not match, and accepting, by the support node, the registration request if the comparison matches.

The method is based on the insight that the combination of location information and equipment identity of stationary user equipment normally does not change. Location update procedures and other mobility management functions known and used in mobile telecommunications are, in fact, superfluous in case of stationary user equipment residing and staying all the time in a same cell of the cellular telecommunication system.

Accordingly, for stationary or fixed user equipment like an M2M-device, a combination of location information and equipment identity can be stored in the telecommunication system. By checking the combination of location information and equipment identity received from stationary user equipment with a stored combination of location information and equipment identity of such stationary user equipment, it can be determined whether the stationary user equipment has left its predefined limited are or position in the geographical area covered by the telecommunication system. That is, whether the stationary user equipment has moved and has become mobile user equipment.

In the context of the present description and claims, a predefined limited area or position is a predefined part of the geographical area covered by a cellular telecommunication system or network, such as a cell, a group of cells, a city, a state, or any other type of limited geographical area covered by the cellular telecommunication system.

By rejecting a registration request of a stationary user equipment requesting service of the cellular telecommunication system outside its predefined limited geographical area, services to such stationary user equipment can be effectively prevented. That is, registration of stationary user equipment to the cellular telecommunication system is only admitted or allowed if the user equipment forwarding a registration request is known as stationary user equipment and resides at the location or position or area for which it is admitted that this stationary user equipment receives service from the cellular telecommunication system.

In the context of the present invention, a registration request is any of an initial registration request of user equipment, that is when the user equipment is activated or powered-up, for example, the initiation of an inter-cell handover by the user equipment, i.e. when the user equipment moves from one cell to another of the cellular telecommunication system covered by a different access unit or base station or functionally separate part of an access unit or base station, and a reply at an active location request from a support node.

In an example, the cellular telecommunication system stores location information and equipment identity of stationary user equipment in at least one device installation register, which device installation register is accessed by the support node to determine whether the registration request is received from stationary user equipment present in the device installation register.

By definition, equipment identities of user equipment stored in this device installation register are marked stationary user equipment. By checking whether the equipment identity received with a registration request is present in the device installation register, it can be validly determined whether the requesting user equipment is registered in the telecommunication network as stationary user equipment.

When a particular user equipment identity is not present in the device installation register and/or when no location information or erroneous location information associated with a particular user equipment identity is present in the device location register, for the purpose of the present method it is assumed that the requesting user equipment is not stationary user equipment.

In a further example, wherein the telecommunication system comprises at least one user database storing profile data of users of the telecommunication system including a user or subscriber identity, such as a Home Location Register, HLR, the profile data of a user is extended by comprising a mobility identifier. This mobility identifier identifies whether the user is a mobile user equipment or a stationary user equipment.

By accessing the user profile of user stored in the user database on the basis of the user or subscriber identity received with a registration request, the support node can determine from the mobility identifier in the user profile whether the registration request is received from stationary user equipment.

In the affirmative, the equipment identity and location information comprised by the received registration request and associated with stationary user equipment are stored, by the support node, in the device installation register.

As described above, the user identity or subscriber identity is, for example, one of an International Mobile Subscriber Identity, IMSI, and Mobile Subscriber Integrated Services Digital Network, MSISDN, number, whereas the equipment identity is the International Mobile Equipment Identity, IMEI, for example.

The location information may be one or a combination of a cell identifier, cell ID, a Radio Access Node identifier, RAN ID, a Routing Area identifier, RA ID, a geographic location determined by a Global Positioning System, GPS, or any other type of location information available to user equipment requesting registration in the cellular telecommunication system.

In the event that a registration request does not comprise location information or erroneous location information, for example, in an other example the support nodes initiates and forwards actively a location request to stationary user equipment requesting registration. The location information received by the support node in reply to the active location request is regarded to represent the actual location information of the stationary user equipment.

The active location request or location update request may also used, for example, for regularly checking the location of stationary user equipment, such as sensors or other M2M-devices that are continuously connected or attached to the telecommunication system. This contrary to sensors or M2M-devices that automatically switch-on or power-up for transmitting data and automatically switch-off or power-down after having sent the data. Such sensors or M2M-devices will have to register first with the telecommunication system for receiving service.

The equipment identity and associated location information of stationary user equipment may be stored with the telecommunication system or device installation register from a network management or maintenance interface, for example. Likewise, the mobility identifier may be stored with a user profile in the user database from a management or maintenance interface.

Having set and stored the mobility identifier for a particular user or subscriber identity, stationary devices that for the first time register with the telecommunication system will be automatically determined as stationary and their equipment identity and location information received with the registration request will be automatically stored in the telecommunication system, such as disclosed above in connection with the device installation register.

However, once the combination of equipment identity and location information of a stationary equipment is stored in the telecommunication system, no modification or change thereof by the support node, based on a received registration request, should be possible.

To allow re-registration of stationary user equipment, for example after maintenance by which the location of the device is changed leading to a change in the stored location information, the method provides for a deletion of location information and equipment identity of stationary user equipment stored in the telecommunication system prior to receiving a registration request of the stationary user equipment. Such a deletion can be performed by the support node and/or via a network management or maintenance interface, for example.

Once deleted, a subsequent registration request of the respective user equipment will be handled as a first time registration, leading to the automatic storage of equipment and identity and location information, as explained above.

In the event that stationary equipment is admitted in a location area covered by a plurality of cells, or a plurality of radio access nodes, for example, at a first time registration an additional check may be performed by the support node using profile data of the user equipment, for example, to determine or establish whether the user equipment is admitted to a particular cell or radio access node admitted to the user equipment. Such a check may also be performed if the stored location information does not match the received location information.

Rejection of a received registration request results, in an example of the method, to a cancellation of a registration of an already registered stationary user equipment. Such to block the user equipment from further receiving services from the telecommunication system. This may be required for stationary user equipment that is continuously attached with or connected to the cellular telecommunication system when, for example, it turns out from an active location request that there is a mismatch between the received and stored location information and equipment identity.

To avoid registration of and providing service to user equipment that is registered as permanently blocked or the like, the support node, after receipt of the registration request, checks whether the stationary user equipment is permitted to receive service from the telecommunication system, based on the equipment identity. Such a check may be performed by accessing a so-called Equipment Identity register, EIR, of the telecommunication system.

In a second aspect there is provided a support node arranged for operation in a cellular telecommunication system for providing communication services to a plurality of users comprising mobile and stationary user equipment, each user equipment having a unique equipment identity. The support node for requesting registration of stationary user equipment comprises:

- a transmission unit, arranged for receiving a registration request of user equipment, the registration request comprising equipment identity and location information associated with the user equipment,
- a control unit, arranged for determining whether the user equipment is stationary user equipment,
- a comparing unit, arranged for comparing the received location information and equipment identity of stationary user equipment with location information and equipment identity of the stationary user equipment stored in the telecommunication system, wherein the control unit further is arranged for
- rejecting the registration request if the comparison does not match, and
- accepting the registration request if the comparison matches.

In a further example, the control unit of the support node is arranged for accessing at least one device installation register arranged for storing location information and equipment identity of stationary user equipment, wherein the control unit is arranged for accessing the device installation register for performing at least one of determining whether the registration request is received from stationary user equipment present in the device installation register, for retrieving equipment identity and location information of stationary user equipment stored in the device location register, for storing in the device installation register equipment identity and location information received of stationary user equipment, and for deleting in the device installation register stored equipment identity and location information of stationary user equipment.

The device installation register, in a further example, is comprised by or integrated with the support node or any other support node operative and accessible in the telecommunication system.

In a third aspect a cellular telecommunication system is provided, comprising at least one support node according to the second aspect of the invention described above.

In an embodiment, the telecommunication system comprises a user database storing profile data of users of the telecommunication system, comprising a user identity and the mobility identifier of users identifying whether the user is one of a mobile and stationary user equipment. This at least one user database, in an example, comprises the device installation register.

Those skilled in the art will appreciate that the rejection of a registration request by a mobile user equipment may lead or trigger alert information or an alert action to a network management centre, for example. The meaning of such an alert may be interpreted dependent on the function or operation of a particular stationary user equipment or M2M-device. Such as stolen, moved outside a monitored limited predefined geographical area, and the like.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of cellular telecommunication system or network.

DETAILED DESCRIPTION

In the drawings, like reference numerals denote identical parts or parts performing an identical or comparable function or operation.

Figure 1A:
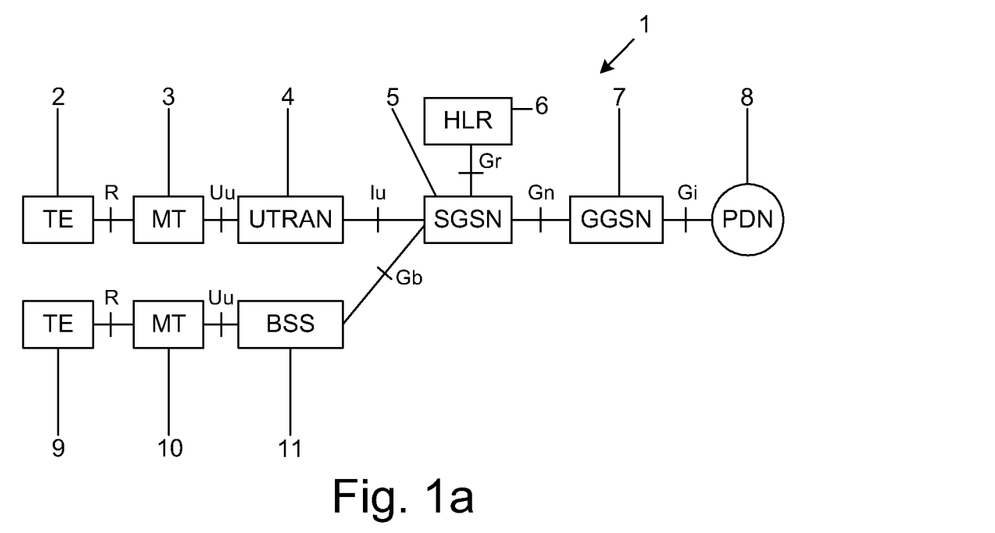
FIG. 1a is a schematic view of a prior art cellular telecommunication network architecture.

FIG. 1a is a schematic view of a prior art cellular telecommunication network architecture, comprising a General Packet Radio Service, GPRS, core network or system 1. Here, users of the telecommunication system may connect to a Serving GPRS Support Node, SGSN, 5, using a different type of Radio Access Network, RAN. The SGSN 5 is arranged for providing communication services to a plurality of users comprising mobile and stationary user equipment.

For example, user equipment, UE, or terminal equipment, TE, 2 connects through an R-interface with a Mobile Termination node, MT, 3. The MT connects in turn through a Uu-interface with a Universal Terrestrial Radio Access Network, UTRAN, node 4. The UTRAN node 4 is connected to the SGSN 5 by an Iu-interface. Another user equipment TE 9 is connected by an R-interface to a Mobile Termination node, MT, 10 and the MT 10 connects through a Uu-interface with a Base Station Subsystem, BSS, RAN node 11. The BSS 11 connects by a Gb-interface to the SGSN 5.

Accordingly, in the system 1 shown in FIG. 1a, SGSN 5 serves a plurality of user equipment 2, 9, which are operative in different types of radio access networks.

The SGSN 5 is further connected by a Gr-interface to a user database 6, for example a Home Location Register, HLR, which is arranged for storing user profile data comprising, amongst other, user identities of user equipment allowed to register on the telecommunication system.

The core network architecture 1 further comprises a Gateway GPRS Support Node, GGSN, 7, which is arranged to exchange communication between the SGSN node 1 and the Packet Data Network node, PDN, 8 over a Gn-interface and a Gi-interface, respectively.

Figure 1B:
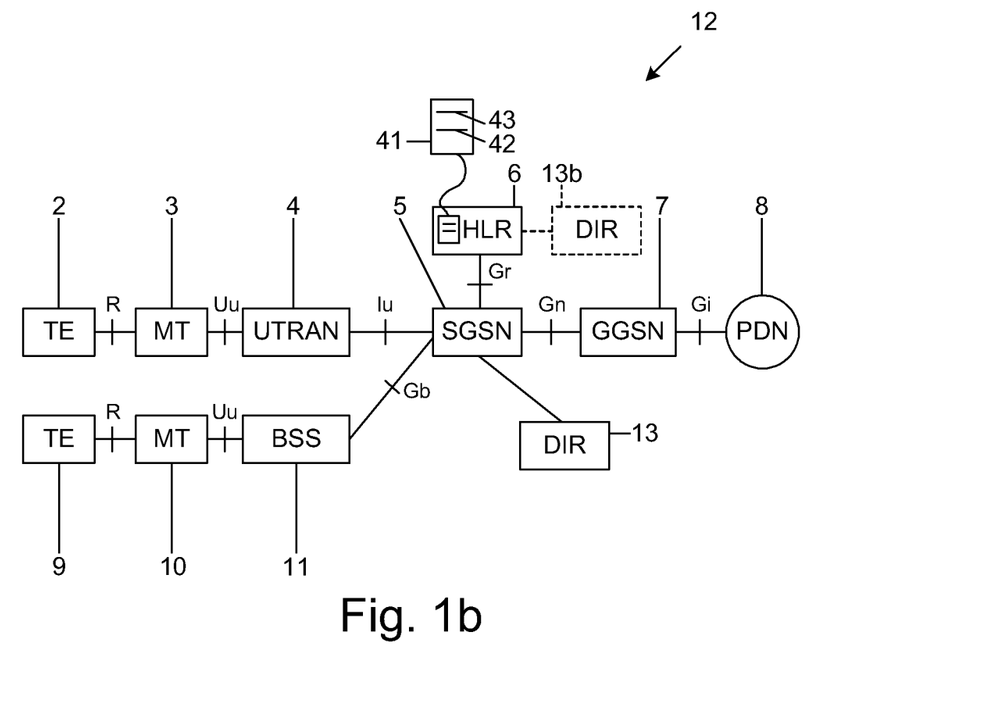
FIG. 1b is a schematic view of an example of architecture of a telecommunication network according to the invention.

FIG. 1b is a schematic view of an example of an architecture 12 of a cellular telecommunication system according to the invention, based on the General Packet Radio Service, GPRS, core network or system 1 shown in FIG. 1b. Here, a Device Installation Register, DIR, 13 is introduced, connected to the support node 5. The DIR 13 is arranged and used for storing equipment identity and location information of stationary user equipment. Alternatively, the DIR may connect to the user database 6 or be comprised in the user database 6, as shown in dotted lines 13b.

The user database 6 further comprises a plurality of user profiles 41, wherein each user profile 41 comprises a corresponding user identity 42 and a mobility identifier 43. The mobility identifier 43 indicates whether the user is a stationary or a mobile user equipment. The mobility identifier 43 may contain a Boolean, text, binary or any other type of value or string. The user identity may comprise the International Mobile Subscriber Identity, IMSI, and/or Mobile Subscriber Integrated Services Digital Network, MSISDN, number, for example.

Figure 2:
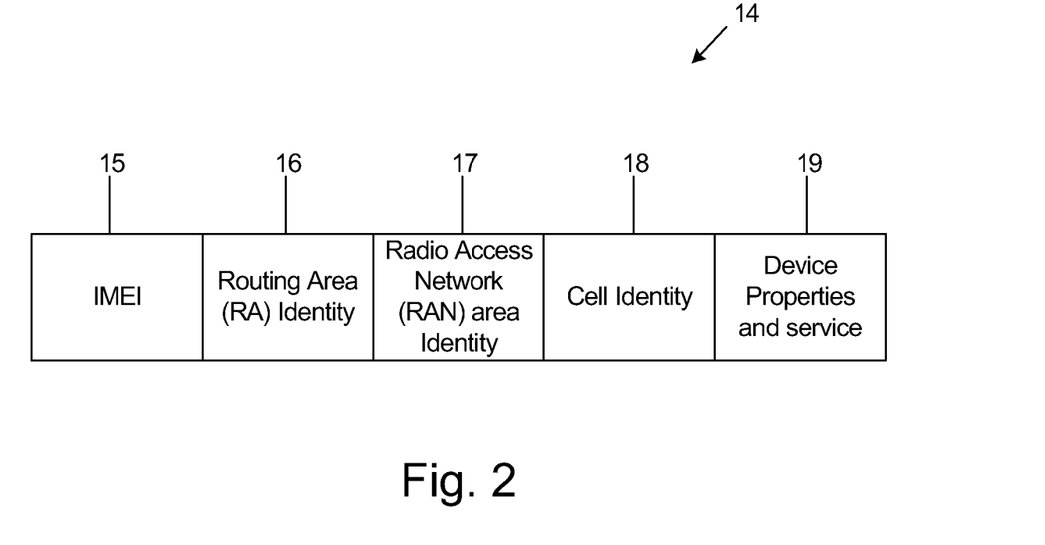
FIG. 2 is a schematic view of an example of an entry in a Device Installation Register according to the invention.

FIG. 2 is a schematic view of an example of an entry 14 in a Device Installation Register associated with stationary user equipment, such as a fixed or stationary M2M-device, according to the invention.

Here, the different entries for stationary equipment are sorted based on the user equipment identity, for example the International Mobile Equipment Identity, IMEI, 15. The entry further comprises a Routing Area, RA, Identity 16, which is an optional identity used for identifying routing areas of communications between a user equipment and the telecommunication system or network.

The entry further comprises a RAN area Identity 17 which identifies the radio access network used by the user equipment, for example a Global System for Mobile communications, GSM, General Packet Radio service, GPRS, or Universal Mobile Telecommunications System, UMTS, network.

The Cell Identity 18 indicates which cell of the cellular telecommunication system is actually serving the user equipment. The Device Properties and service 19 are a set of data the values and structure of which may change in relation to their semantic.

Figure 3:
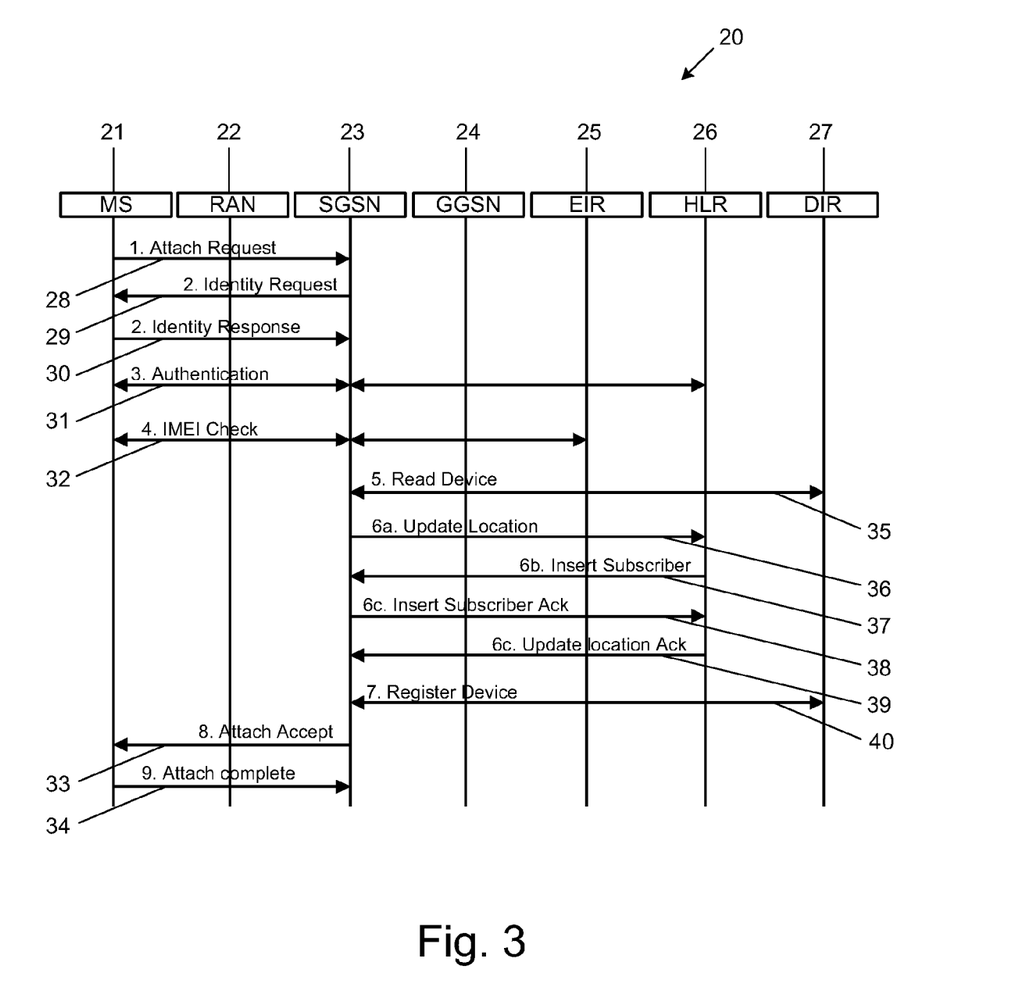
FIG. 3 is a schematic view of an example of a method of requesting registration in a cellular telecommunication system according to the invention.

FIG. 3 is a schematic view of an example of a method of requesting registration 20 in a cellular telecommunication system according to the invention as shown in FIG. 1b, for example.

Here, user equipment, UE, or Mobile Station, MS, 21 requests registration to the telecommunication system by sending, initially, an Attach Request message 28 via the RAN 22 to the support node SGSN 23 of the telecommunication system. The Attach Request message 28 may comprise a user identity of and location information associated with the user equipment 21.

In case the user equipment 21 is not known by the support node 23, for example during an initial registration phase of the user equipment 21, the support node 23 requests the identity of the user equipment 21 via an Identity Request message 29. The user equipment 21 sends an Identity Response message 29 comprising a unique equipment identity, for example IMEI, of the user equipment 21.

If no registration of the user equipment 21 is known to the support node 23, Authentication 31 of the user equipment 21 may be requested at the user database, for example the Home Location Register 26. Optionally, the unique equipment identity of the user equipment 21 may be checked, IMEI Check, 32 in an Equipment Identity Register, EIR, 25 comprising, for example, blacklisted equipment.

The EIR 25 is an optional node in the network wherein, for example, the equipment identity of stolen, forged, false or unauthorized equipment is stored. If no registration of the equipment identity of the user equipment 21 is found in the EIR 25, registration continues. In case the EIR 25 does contain a registration for the user equipment 21, the registration request 28 is denied by the support node 23.

The support node 23 is further arranged to determine whether the user equipment 21 is a stationary user equipment. In the example shown in FIG. 3, the support node 23 checks with a Read Device message 35 whether the equipment identity of the user equipment 21 is present in the Device Installation Register 27.

When a particular user equipment identity is not present in the Device Installation Register 27 and/or when no location information or erroneous location information associated with a particular user equipment identity is present in the Device Location Register, it is assumed that the requesting user equipment 21 is not stationary user equipment.

In case the Attach Request message 28 does not comprise location information associated with the user equipment 21, the support node 23 may perform an active location check, for example in the context of the Authentication 31, for determining the actual location of the user equipment 21.

An active location check may comprise a Global Positioning Location, GPS, check, or a three-point measurement using, for example, different support nodes present in the cellular telecommunication system or network, as known to the person skilled in the art.

Alternatively, the presence of the user equipment 21 in the Device Installation Register, DIR, 27, may be checked prior to the authentication step 31, i.e. Read Device message 35. If the DIR 27 contains the equipment identity of the user requesting registration, the user equipment 21 may be considered to be stationary user equipment. Accordingly, there is no need for the support node 23 for requesting authentication to the HLR 26 since the user equipment is already authenticated by the DIR 27. In such a case, the authentication step 31 may be omitted.

In case no registration of the user equipment 21 is found in the DIR 27, for example during an initial registration procedure, the method continues and updates the location of the user equipment 21 in the HLR 26 using an Update Location message 36. The HLR 26 responds by sending an Insert Subscriber message 37, comprising, amongst other, a user identity of the user equipment 21, such IMSI and/or MSISDN number.

Such an initial registration may be provoked by having the support node 23, on request of a provider of the telecommunication system or another authority, such as an installer of M2M-devices, to delete location information and equipment identity 14 of stationary user equipment stored in the DIR 27 prior to receiving a registration request 28 of stationary user equipment.

The user identity of the user equipment 21 may also be shared by other user equipment, creating a group user profile. For example, M2M-devices such as sensors which are utilized for measuring coherent aspects at a same location may be regarded as a group of sensors sharing a same group user profile. Note that each device among such group can be distinguished by its unique equipment identity.

After acknowledgement messages 38, 39, for the Insert Subscriber message 37 and the Update location message 36, have been sent and received, the support node 23 checks the user identity of the user equipment 21 for a mobility identifier in the HLR 26. The mobility identifier indicates whether the user equipment 21 is a stationary or a mobile user equipment. In case the user equipment 21 is stationary, the support node 23 registers the user equipment 21 in the DIR 27 by a Register Device message 40.

The support node 23 is further arranged to compare the received location information and equipment identity associated with the user equipment 21 against the equipment identity and location information of the respective user equipment stored in the DIR 27. If the comparison of the location information based on the equipment identity matches, the support node 23 accepts the registration request by sending an Attach Accept message 33 to the user equipment 21. Finally, the user equipment acknowledges safe receipt of the Attach Accept message 33 by sending an Attach complete message 34 to the support node 23.

Once registration has been accepted and completed, the fixed or stationary user device receives service from the telecommunication system, as known to those skilled in the art.

Figure 4:
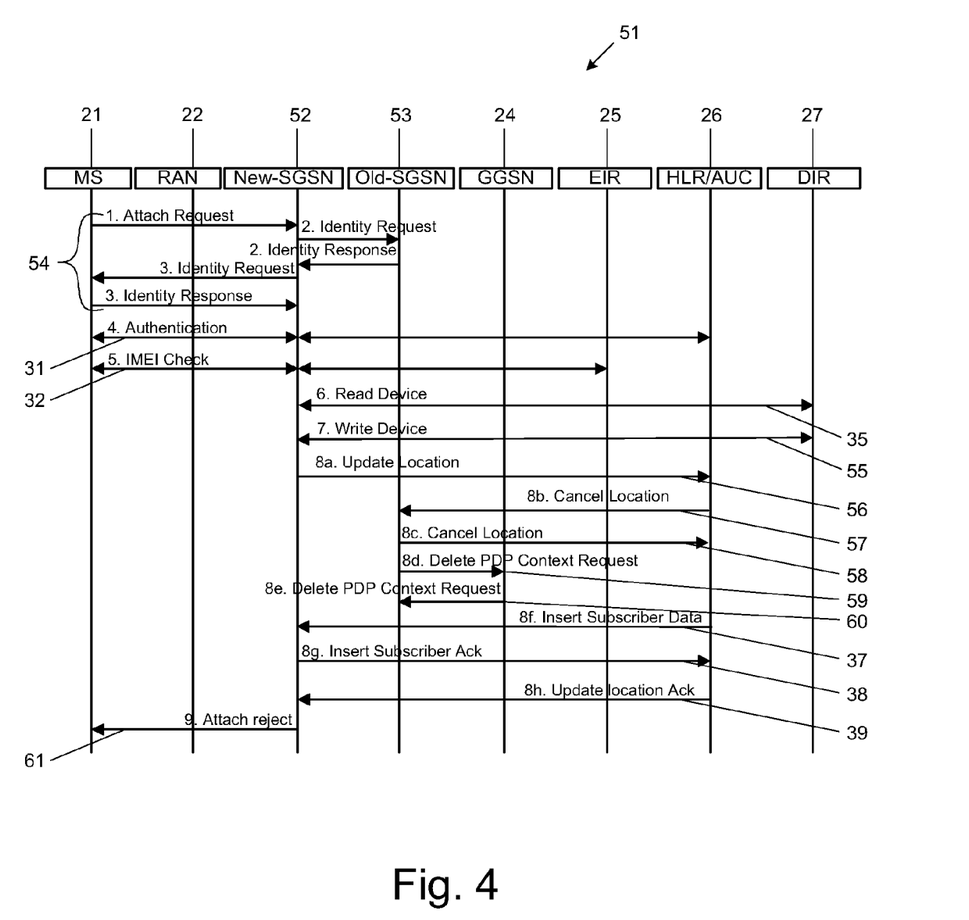
FIG. 4 is a schematic view of an example of a method of requesting registration for user equipment in a handover situation according to the invention.

FIG. 4 is a schematic view of an example of a method of requesting registration 51 for a user equipment in a handover situation according to the invention. In this case, the user equipment 21 is requesting registration to a new support node 52, New-SGSN, instead of it previous, or old support node 53, Old-SGSN, due to changes in the geographic location of the user equipment 21. Note that the user equipment 21 is registered in the DIR 27 against the Old-SGSN 53, i.e. a cell identity associated or corresponding to the Old-SGSN. See FIG. 2.

The first steps 54 of the method shown in FIG. 4 correspond to the first steps 28, 29, 30 of the method shown in FIG. 3. Here, a user equipment, MS, 21 requests registration to the cellular telecommunication network by sending an Attach Request message to the new support node 23. Instead of handling identity requests as is shown in FIG. 3, the method comprises an additional step of requesting the old support node 53 for the identity of the user equipment 21. Depending on the Identity response of the old support node 53, the new support node 52 may request Identity to the user equipment 21, as shown in FIG. 3.

The new support node 52 checks the Device installation Register 27 if the user equipment identity is present, after an optional Authentication 31 and an optional IMEI check 32. In case the user equipment's identity is present in the Device Installation Register 27, the new support node 52 reads and compares 35 the received location information and the equipment identity of the user equipment 21 with the location information and equipment identity of the user equipment stored in the Device Installation Register 27.

This comparison will not match since the user equipment 21 registers with a cell identity, for example, associated with the new support node New-SGSN 52, while the user equipment 21 is associated, in the Device Installation Register 27, to a cell identity, for example, of the old support node Old-SGSN 53. In other words, due to location changes of the user equipment 21, i.e. the user equipment 21 requests attachment to a new support node 52, the location information stored in the Device Installation Register 27 does not match the location information received by the new support node 52.

The method continues with the cancellation of possible active Packet Data Protocols, PDP, Context requests 59, 60 by the old support node 53. Finally, the new support node 52 rejects 61 the registration request of the user equipment 21, since the location information stored in the Device Installation Register 27 does not match the received location information.

The new support node 52 may also be arranged for issuing, for example, an alarm, alert, warning, etc. message to the requesting user or a provider or agency or the like, entrusted with the management of the equipment requesting registration if the comparison does not match.

The new support node 52 is further arranged to update 56 the HLR 26 with the newly received location information, and the HLR 26 cancels 57 the location of the user equipment 21 known by the old support node 27.

Figure 5:
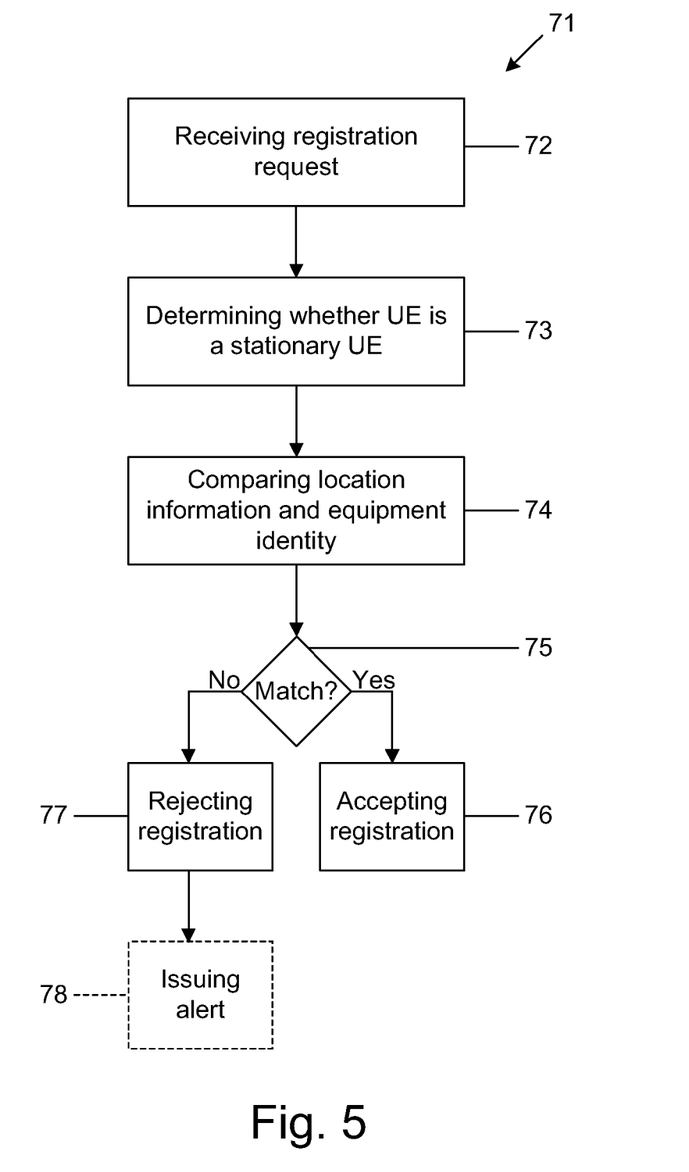
FIG. 5 shows a flowchart illustrating the improved method in a first aspect of the invention.

FIG. 5 shows a flowchart 71 illustrating the improved method in a first aspect of the invention.

As a first step, a support node receives 72 a registration request of a user equipment, UE, present in a cellular telecommunication system or network. A registration request may be considered as an initial request to connect to the telecommunication system or network, but also, for example, an updated request to connect to another support node, i.e. due to an updated location of the user equipment.

The support node is arranged to determine 73 whether the user equipment requesting registration is a stationary user equipment. Several options may exist to do so. One of the options is to check a user database, for example an HLR present in the telecommunication system, for a user profile. The user profile contains an indication whether the user equipment is stationary or mobile. This indication is referred to as a mobility identifier of the user equipment.

Another possibility is to search a Device Installation Register for the user equipment identity. The Device Installation Register is an additional register comprising equipment identities and location information of stationary user equipment. The Device Installation Register does not contain information concerning mobile user equipment.

For a stationary user equipment, the support node compares 74 the received location information and equipment identity with location information and equipment identity of the user equipment stored in the Device Installation Register.

If there is a successive match 75, the support node accepts 76 registration of the user equipment to the telecommunication network. If there is not a successive match, for example due to location changes of the user equipment, the support node rejects 77 the registration request of the user equipment.

Optionally, as indicated by dotted lines, in case of rejecting the registration request, the support node may be arranged to issue an alert 78 that the actual location information of the user equipment does not match the location information stored in the telecommunication network. The alert 78 may be sent to any person or machine in the network, for example a supervisor, network operator, etc. Issuing the alert 78 may also take place right after it is established that the comparison does not match 75.

Further, the support node may cancel a registration 14 of registered stationary user equipment in the device installation register if a registration request received of stationary user equipment is rejected.

Figure 6:
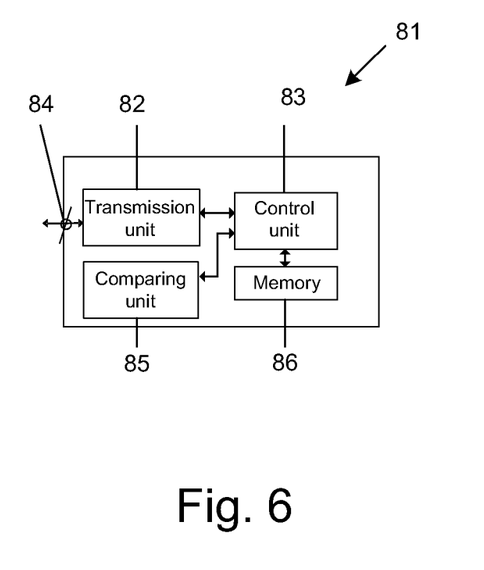
FIG. 6 is a schematic view of support node for use in a cellular telecommunication system according to an aspect of the present invention.

FIG. 6 is a schematic view of support node 81 for use in a cellular telecommunication system according to an aspect of the present invention.

The support node 81, among others, comprises a transmission unit 82 having a transmission unit input/output 84, a comparing unit 85 and a storage or memory unit 86, all connected to a control unit 83.

The comparing unit 85 is arranged for comparing received location information and equipment identity of stationary user equipment, comprised in a corresponding registration request, with location information and equipment identity of same stationary user equipment stored in the telecommunication system, for example stored in the Device Installation Register 13, 13b, FIG. 1b.

The control unit 83 is arranged for rejecting the registration request if the comparison by the comparing unit 85 does not match, and accepting the registration request if the comparison matches.

The present invention is not limited to the embodiments as disclosed above, and can be modified and enhanced by those skilled in the art beyond the scope of the present invention as disclosed in the appended claims without having to apply inventive skills.

The invention claimed is:

1. A method of requesting registration of stationary user equipment, being stationary with respect to a predefined limited geographic area, in a cellular telecommunication system, the system comprising at least one support node for providing communication services to a plurality of users comprising mobile and stationary user equipment, each user equipment having a unique equipment identity, the method comprising:
   receiving, by a support node, a registration request of user equipment, the registration request comprising equipment identity and location information associated with the user equipment;
   determining, by the support node, that the user equipment is identified as stationary user equipment;
   determining, by the support node, whether the stationary user equipment has left the predefined limited geographic area based on comparing, by the support node, the received location information and equipment identity of stationary user equipment with location information and equipment identity of stationary user equipment stored in the telecommunication system;
   in response to the support node determining, based on the comparing, that the stationary user equipment has left the predefined limited geographic area, the support node rejecting the registration request;
   in response to the support node determining, based on the comparing, that the stationary user equipment has not left the predefined limited geographic area, the support node accepting the registration request.

2. The method of claim 1:
   wherein the telecommunication system comprises at least one device installation register storing location information and equipment identity of stationary user equipment;
   wherein the determining that the user equipment is identified as stationary user equipment comprises the support node accessing the device installation register.

3. The method of claim 1:
   wherein the telecommunication system comprises at least one user database storing profile data of users of the telecommunication system, the profile data of a user comprising a user identity and a mobility identifier, the mobility identifier identifying whether the user is one of a mobile and a stationary user equipment;
   wherein the registration request comprises a requesting user identity;
   wherein the determining that the user equipment is identified as stationary user equipment comprises the support node accessing the user database.

4. The method of claim 3:
   wherein the telecommunication system comprises at least one device installation register storing location information and equipment identity of stationary user equipment;
   further comprising storing, by the support node, the equipment identity and location information of the received registration request in the device installation register in response to determining that the user equipment is associated with stationary user equipment.

5. The method of claim 1:
   wherein the support node sends location requests to stationary user equipment requesting registration;
   wherein, in response to the location requests, the support node receives location information of stationary user equipment.

6. The method of claim 1 wherein the support node, on request, deletes location information and equipment identity of stationary user equipment stored in the telecommunication system prior to receiving the registration request.

7. The method of claim 1 wherein, in response to the support node determining, based on the comparing, that the stationary user equipment has left the predefined limited geographic area, the support node further cancels a registration of the user equipment associated with the registration request.

8. The method of claim 1 wherein the support node, after receipt of the registration request, checks whether the stationary user equipment is permitted to receive service from the telecommunication system based on the received equipment identity.

9. The method of claim 1 wherein a registration request is one of:
   an initial registration request of user equipment when activated;
   an initiation of an inter-cell handover;
   a reply to a location request from the support node.

10. A support node for requesting registration of stationary user equipment, being stationary with respect to a predefined limited geographic area, in a cellular telecommunication system that provides communication services to a plurality of users comprising mobile and stationary user equipment, each user equipment having a unique equipment identity, the support node comprising:
   a transceiver configured to receive a registration request of user equipment, the registration request comprising equipment identity and location information associated with the user equipment;
   one or more processing circuits configured to operate as:
      a control unit configured to determine that the user equipment is identified as stationary user equipment;
      a comparing unit configured to determine whether the stationary user equipment has left the predefined limited geographic area based on comparing the received location information and equipment identity of stationary user equipment with location information and equipment identity of the stationary user equipment stored in the telecommunication system;
      wherein the control unit is further configured to:
         reject the registration request, in response to the comparing unit determining that the stationary user equipment has left the predefined limited geographic area;
         accept the registration request, in response to the comparing unit determining that the stationary user equipment has not left the predefined limited geographic area.

11. The support node of claim 10:
   wherein the control unit is further configured to access at least one device installation register, the device installation register storing location information and equipment identity of stationary user equipment, in order to perform at least one of:

determining whether the registration request is received from stationary user equipment present in the device installation register;

retrieving equipment identity and location information of stationary user equipment stored in the device location register;

storing, in the device installation register equipment, identity and location information received of stationary user equipment;

deleting, in the device installation register, stored equipment identity and location information of stationary user equipment.

12. The support node of claim 11 wherein the support node comprises the device installation register.

13. A cellular telecommunication system, comprising;

a plurality of user devices comprising mobile and stationary user equipment with respect to a predefined limited geographic area, each user equipment having a unique equipment identity;

a support node comprising:

a transceiver configured to receive a registration request of user equipment, the registration request comprising equipment identity and location information associated with the user equipment;

one or more processing circuits configured to operate as:

a control unit configured to determine that the user equipment is identified as stationary user equipment;

a comparing unit configured to determine whether the stationary user equipment has left the predefined limited geographic area based on comparing the received location information and equipment identity of stationary user equipment with location information and equipment identity of the stationary user equipment stored in the telecommunication system;

wherein the control unit is further configured to:

reject the registration request, in response to the comparing unit determining that the stationary user equipment has left the predefined limited geographic area;

accept the registration request, in response to the comparing unit determining that the stationary user equipment has not left the predefined limited geographic area.

14. The cellular telecommunication system of claim 13:

wherein the control unit is further configured to access at least one device installation register, the device installation register storing location information and equipment identity of stationary user equipment, in order to perform at least one of:

determining whether the registration request is received from stationary user equipment present in the device installation register;

retrieving equipment identity and location information of stationary user equipment stored in the device location register;

storing, in the device installation register equipment, identity and location information received of stationary user equipment;

deleting, in the device installation register, stored equipment identity and location information of stationary user equipment.

15. The telecommunication system of claim 14 further comprising at least one user database storing profile data of users of the telecommunication system, the profile data of a user comprising a user identity and a mobility identifier, the mobility identifier identifying whether the user is one of a mobile and a stationary user equipment.

16. The telecommunication system according to claim 15 wherein the at least one user database comprises the device installation register.

17. The method of claim 1, wherein determining, by the support node, whether the stationary user equipment has left the predefined limited geographic area is further based on the comparing indicating that the received location information and equipment identity do not match the telecommunication system stored location information and equipment identity.

18. The support node of claim 10, wherein the comparing unit is configured to determine whether the stationary user equipment has left the predefined limited geographic area based further on the comparing indicating that the received location information and equipment identity do not match the telecommunication system stored location information and equipment identity.

19. The cellular telecommunication system of claim 13, wherein the comparing unit is configured to determine whether the stationary user equipment has left the predefined limited geographic area based further on the comparing indicating that the received location information and equipment identity do not match the telecommunication system stored location information and equipment identity.

\* \* \* \* \*